(12) United States Patent
Sengodan et al.

(10) Patent No.: US 7,290,141 B2
(45) Date of Patent: Oct. 30, 2007

(54) AUTHENTICATION OF REMOTELY ORIGINATING NETWORK MESSAGES

(75) Inventors: Senthil Sengodan, Burlington, MA (US); Tat Chan, Wakefield, MA (US)

(73) Assignee: Nokia, Inc., Irving, TX (US)

( * ) Notice: Subject to any disclaimer, the term of this patent is extended or adjusted under 35 U.S.C. 154(b) by 708 days.

(21) Appl. No.: 10/180,096

(22) Filed: Jun. 27, 2002

(65) Prior Publication Data
US 2004/0003241 A1    Jan. 1, 2004

(51) Int. Cl.
G06F 7/04    (2006.01)
G06K 9/00    (2006.01)
H04L 9/00    (2006.01)

(52) U.S. Cl. .............. 713/168; 713/155; 713/170; 380/252; 726/2; 726/5

(58) Field of Classification Search .......... 713/184, 713/168; 380/262, 45
See application file for complete search history.

(56) References Cited

U.S. PATENT DOCUMENTS

| | | | | | |
|---|---|---|---|---|---|
| 5,402,490 | A | * | 3/1995 | Mihm, Jr. ............... | 380/247 |
| 5,434,918 | A | * | 7/1995 | Kung et al. ............. | 713/169 |
| 5,506,905 | A | * | 4/1996 | Markowski et al. ..... | 380/262 |
| 5,546,463 | A | * | 8/1996 | Caputo et al. .......... | 713/159 |
| 5,594,794 | A | * | 1/1997 | Eyer et al. .............. | 380/231 |
| 5,696,824 | A | * | 12/1997 | Walsh .................... | 705/75 |
| 5,923,758 | A | * | 7/1999 | Khamharn et al. ..... | 380/262 |
| 6,144,848 | A | * | 11/2000 | Walsh et al. ........... | 455/419 |
| 6,167,137 | A | * | 12/2000 | Marino et al. .......... | 380/255 |
| 2002/0073229 | A1 | * | 6/2002 | Hayashi ................. | 709/237 |
| 2002/0138848 | A1 | * | 9/2002 | Alao et al. ............. | 709/231 |
| 2003/0046391 | A1 | * | 3/2003 | Moreh et al. .......... | 709/225 |

OTHER PUBLICATIONS

S. Moyer et al., "Framework Draft for Networked Appliances using the Session Initiation Protocol", Internet Engineering Task Force, Internet-Draft, Jun. 2001, pp. 1-25.

T. Wu, "The Secure Remote Password Protocol", Proceedings of the 1998 Internet Society Network and Distributed System Security Symposium, San Diego, CA, Mar. 1998 (Printed from http://www-cs-studentds.standford.edu/~tjw/srp/ndss.html on May 30, 2002).

(Continued)

*Primary Examiner*—Kambiz Zand
*Assistant Examiner*—A. Nobahar
(74) *Attorney, Agent, or Firm*—Banner & Witcoff, Ltd.

(57) ABSTRACT

A method and system for authenticating messages received from users across multiple remote devices are provided. A residential gateway authenticates a user using a modified digest authentication scheme by storing a sequence number in the nonce field. Access encryption keys and sequence number spaces may be assigned based on user or on user/remote device pairs. When sequence number spaces are assigned based on user, and the user uses multiple remote devices to access the residential gateway, the sequence number space may be divided into mini-sequence number spaces for each of the multiple remote devices. Access encryption may be two-tiered, such that a secondary key is generated based on a user's primary key, and the secondary key is only valid for a limited amount of time before it expires and a new secondary key must be generated.

17 Claims, 7 Drawing Sheets

OTHER PUBLICATIONS

J. Franks, et al., "HTTP Authentication: Basic and Digest Access Authentication", Network Working Group, RFC: 2617, Obsoletes: 2069, Category: Standards Track, Jun. 1999, pp. 1-34.

S. Kent et al., "Security Architecture for the Internet Protocol", Network Working Group, RFC: 2401, Obsoletes: 1825, Category: Standards Track, Nov. 1998, pp. 1-62 (Printed from http://ww.ietf.org/rfc2401.txt?number=2401 on May 20, 2002).

S. Kent et al., "IP Authentication Header", Networking Working Group, RFC: 2402, Obsoletes: 1826, Category: Standards Track, Nov. 1998, pp. 1-21 (Printed from http://www.ietf.org/rfc/rfc2402.txt?number=2402 on May 20, 2002.

S. Kent et al., "IP Encapsulating Security Payload (ESP)", Networking Working Group, RFC: 2406, Obsoletes: 1827, Category: Standards Track, Nov. 1998, pp. 1-21 (Printed from http://www.ietf.org/rfc/rfc2406.txt?number=2406 on May 20, 2002).

J. Franks et al., "An Extension to HTTP: Digest Access Authentication", Networking Working Group, RFC: 2069, Category: Standards Track, Jan. 1997, pp. 1-18.

HAVi: Home Audio Video Interoperability, 2 pages, printed from http://www.havi.org/ on May 30, 2002.

(OWASP), The Open Web Application Security Project, 3 pages, printed from http://www.owasp.org/asac/auth-session/replay.shtml on May 20, 2002.

Joseph Ashwood, "RE: proposed Nonce attribute", 1 page, printed from http://lists.w3.org/Archives/Public/xml-encryption/2001Jul/0004.html on May 20, 2002.

Linuxsecurity.com Resources, 1 page, printed from http://www.linuxsecurity.com/dictionary/dict-330.html on May 20, 2002.

Nonce, 1 page, printed from http://wildesweb.com/glossary/nonce on May 20, 2002.

Nonce—a searchSecurity definition, 1 page, printed from http://www.searchsecurity.techtarget.com/sDefinition/0,,sid14_gci775421,00.html on May 20, 2002.

William Stallings, "Cryptography and Network Security: Principals and Practice, $2^{nd}$ Edition", Prentice Hall, 1999.

* cited by examiner

AUTHENTICATION OF REMOTELY ORIGINATING NETWORK MESSAGES

FIELD OF THE INVENTION

The invention relates generally to computer networks and remote access to computer networks. More specifically, the invention relates to authenticating remotely originating control messages, and authenticating control messages for networked appliances.

BACKGROUND OF THE INVENTION

Home automation and remotely controlling appliances and other systems in homes is a growing field. Home automation examples include an alarm clock that automatically sets the correct time to wake up a user based on weather and traffic conditions, routing a video stream from a baby-sit camera to a user's remote business office, remotely identifying a person at the door of a user's home and opening the door accordingly, turning lights on and off, and adjusting the heating and air conditioning prior to a user's returning home, all through remote access systems. Generally, any dedicated or limited function consumer device containing at least one networked processor that can be remotely controlled is referred to as a networked appliance (NA).

Home automation introduces new security problems that must be addressed. If an attacker gains unauthorized access to home automation systems and networked appliances, the attacker can monitor movement in or around a house, determine when residents are home, and otherwise gain control over NAs in the victim's home. Using known passive network eavesdropping techniques, an attacker can determine the existence of certain appliances and the times and frequencies a user accesses these appliances, leaving the networked appliances vulnerable to replay and man-in-the-middle network attacks, as are known in the art. If the attacker can break the encryption used to hide the content of each message, the attacker can actually gain control of the networked appliances themselves. Thus, adequate security must be provided to prevent unauthorized eavesdropping of and access to networked appliances.

Previous security measures include the use of basic/digest authentication, secure sockets layer (SSL), transport layer security (TLS), and IPSec. However, these known security measures are not optimized for use with networked appliances because in networked appliance systems there is usually frequent communication between a relatively small set of entities. That is, the above mentioned security measures typically require several administrative message exchanges between the two communicating parties in order to establish authenticated and secure data communications. Thus, it would be an advancement in the art to provide network message security optimized against attackers of networked appliances and home automation systems. It would also be an advancement in the art to reduce the number of administrative messages required to establish authenticated and secure communications between two parties.

BRIEF SUMMARY OF THE INVENTION

The inventive method and system overcomes the problems of the prior art by providing an authentication and encryption scheme that accommodates a user accessing networked appliances through a residential gateway from multiple remote devices. One aspect of the invention provides a challenge-response authentication scheme whereby, in a network message, the nonce field is populated with a sequence number of the message. A residential gateway receives the message containing, among other information, the sequence number, an authentication credential, and a user ID, and retrieves a shared secret corresponding to the user ID. The residential gateway recomputes the authentication credential using the retrieved shared secret, the sequence number, and other information. It then compares the resulting credential value to the received credential value.

Another aspect of the invention provides a residential gateway that assigns sequence number spaces to users for each remote device the user uses to access the residential gateway. The residential gateway stores information corresponding to ranges of sequence numbers associated with user/remote device pairs, and also stores sliding window information corresponding to each range of sequence numbers. The residential gateway, upon receiving a first message with a user ID and a first remote device ID, assigns a first available range of sequence numbers to the user ID/first remote device ID pair. Upon receiving a second message with the user ID and a second remote device ID, the residential gateway assigns a second available range of sequence numbers to the user ID/second remote device ID pair.

Another aspect of the invention provides a residential gateway that authenticates communications from multiple users using multiple remote devices to communicate with at least one networked appliance. The residential gateway initially establishes a primary key corresponding to the user, and subsequently generates a secondary key based on the primary key. The secondary key is only valid for a predetermined amount of time. The residential gateway authenticates and decrypts messages received from the user within the predetermined amount of time based on the secondary key.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
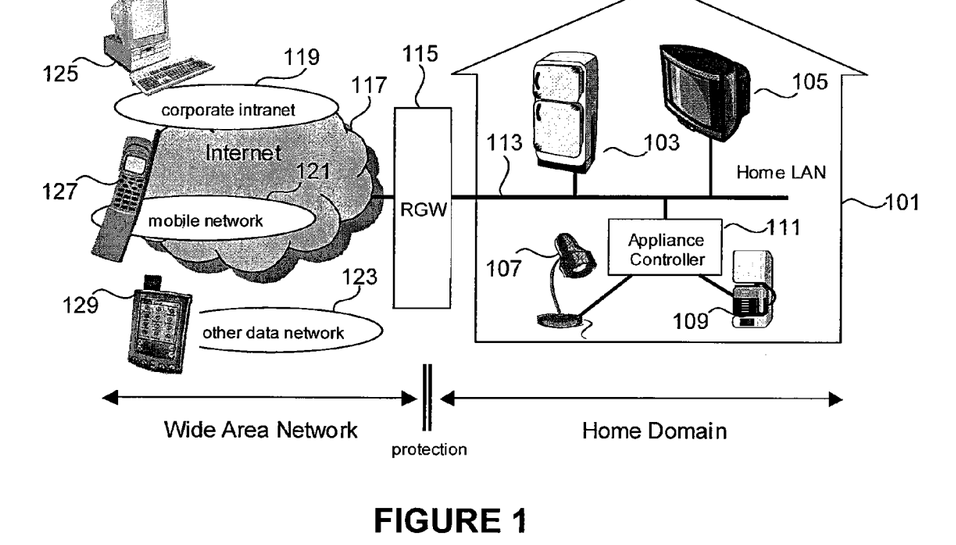
FIG. 1 illustrates a networked appliance system architecture that may be used in accordance with one or more illustrative embodiments of the invention.

FIG. 1 illustrates a typical architecture of a remotely accessible networked appliance system. Within a home 101 of a user, there may exist one or more networked appliances 103, 105, 107, and 109 interconnected via a local network 113, such as a home local area network (LAN). Home LAN 113 may include a conventional wired network, a wireless LAN, HomeRF, or any other local area network. One or more network appliances, e.g., networked appliances 103 and 105, may be "smart" networked appliances that include a controller that can receive and interpret control messages. Other networked appliances, e.g., networked appliances 107 and 109, may be "dumb" networked appliances that can not independently receive and interpret control messages, but which are controlled instead through a separate appliance controller 111. The local network 113 may be protected by a residential gateway (RGW) 115. RGW 115 may perform network address translation, routing, and firewall functions, as well as any other functions typically performed by a gateway and/or router.

The RGW 115 is typically connected to a wide area network (WAN) 117, such as the Internet. WAN 117 may further be connected to one or more remote networks 119, 121, and 123, such as corporate intranets, mobile networks, and any other data networks. Through these remote networks, a user can control his or her home networked appliances using software on a remote data processing device 125, 127, or 129, such as a personal computer, mobile telephone, personal digital assistant, or the like. Using the remote data processing device, the user can originate and send control messages to a networked appliance (NA) via one or more of the remote networks and wide area network, through the RGW 115, and via the local network 113. While the term 'user' generally refers to a human user, it should be appreciated that a user may also refer to a device or resource, or other automated program that is controlling or communicating with one or more networked appliances via the RGW 115.

Figure 2:
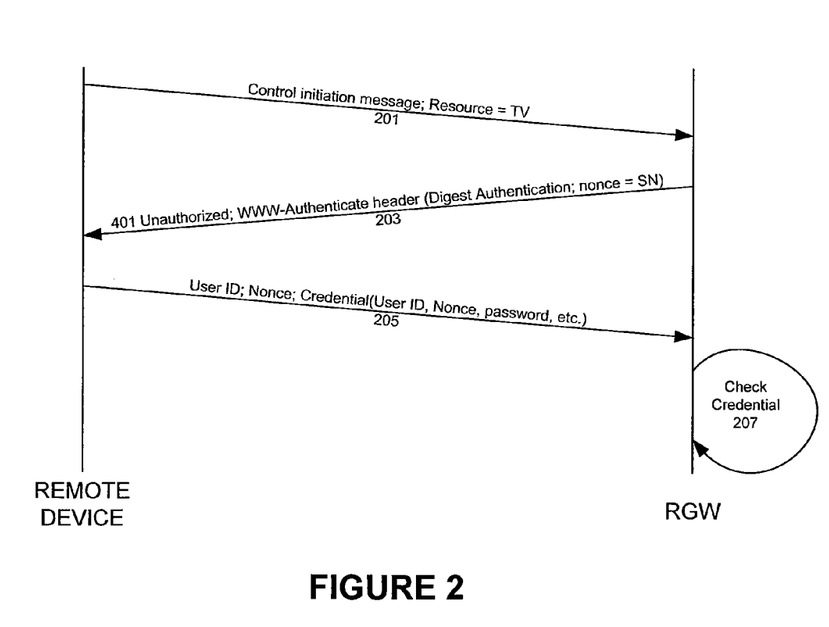
FIG. 2 illustrates a general digest authentication method according to an illustrative embodiment of the invention.

FIG. 2 illustrates a method for authenticating messages received from a user based on a modified digest authentication scheme according to an illustrative embodiment of the invention. Digest authentication is initiated in step 201 by a user, via a remote device 125, sending a control initiation message to the RGW 115. The control initiation message may be an HTTP GET message, an SIP INVITE message, or the like, and indicates a desired resource (networked appliance). In FIG. 2, the illustrative desired resource is the television.

In response to the control initiation message, the RGW 115 responds in step 203 with a message indicating that the user is not yet authorized to control the specified resource. The response message may be of the type 401 Unauthorized, as is known in the art. It may indicate that the Digest Authentication scheme is being used; and it may also indicate a nonce value N. A nonce value, conventionally, is a number based on a random value or based on a timestamp of the server sending the message (in this example, the RGW), and is used to prevent replay attacks. However, in the present invention, the nonce value is used to represent a message sequence number (SN) for use by the remote device 125 in accessing the networked appliances through the RGW 115. The sequence number may start at zero (0), one (1), or any other value as determined by the RGW 115, as described herein. One of skill in the art will appreciate that the sequence number may be any value type that may be incremented, and is not limited to numerical values. In one illustrative embodiment, the nonce field may be a 32 bit field, and thus allows sequence number representations from $0 \leq SN < 2^{32}$.

In step 205, the remote device 125 computes an authentication credential (e.g., a hash value according to Digest Authentication, as described in Internet Engineering Task Force (IETF) Request For Comments (RFC) 2617), based on a secret corresponding to the user (e.g., a password), the nonce value, and other appropriate information (see, e.g., IETF RFC 2617), and sends the credential along with the ID of the user to the RGW 115. It should be appreciated that the secret may include any shared secret between the user and the RGW 115, including passwords, authentication algorithms, encryption keys, and the like. Examples used herein use a password for illustrative purposes only. Other types of shared secrets may alternatively be used.

The RGW 115 may first check the validity of the received nonce value. If the nonce is valid, the RGW 115 may then in step 207 independently recreate the authentication credential using the received nonce value and a stored password for the user with the received user ID. If the credential values match, the user is authenticated and may control the requested resource using the remote device. Once the sequence number has been initialized and the remote device has been authenticated, application layer software (or hardware) in the remote device may increment the nonce (sequence number) with each subsequent NA control message.

In an alternative embodiment, the sequence number may be manually initialized. That is, instead of indicating an initial sequence number in an authentication challenge message, a user may manually assign an initial sequence number. In such an embodiment, a user may assign an initial sequence number when the user installs software or updates configuration settings for software stored in the RGW, the remote device, or both. The RGW and the remote device may then operate according to predefined software instructions instructing the remote device to increment the sequence number according to the software algorithm, e.g., in increments of one.

Often a computer network does not guarantee sequential delivery of messages. That is, messages sent in quick succession may be delivered in a different order from that in which the messages were sent. In addition, some networks do not guarantee delivery of each message, so there is a possibility that a message can be lost (and never delivered), and then subsequent messages are successfully delivered. In an illustrative embodiment of the invention, in order to handle these scenarios, application layer software in the RGW 115 may use a sliding sequence number (SN) window to indicate expected, received, and allowed sequence numbers. This also helps prevent against replay-type attacks.

Figure 3:
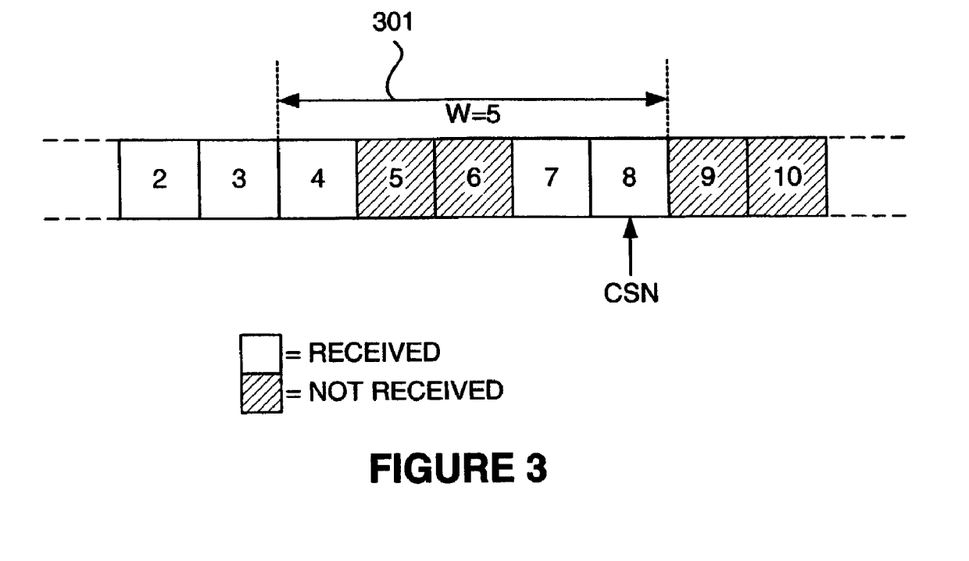
FIG. 3 illustrates a sequence number sliding window according to an illustrative embodiment of the invention.

With reference to FIG. 3, a sliding window 301 of size W indicates a range of expected or allowed sequence numbers. The current sequence number (CSN) corresponds to the message received with the highest sequence number (SN). The beginning of the sliding window 301 thus corresponds to CSN-W+1. The RGW maintains information on whether a message with each SN in the sliding window has been received. Messages with sequence numbers CSN-W+1 or higher that have not previously been received will be accepted, and the receipt of a message with a sequence number greater than CSN causes the RGW to adjust the sliding window 301 to the SN of the received message. Messages with sequence numbers that have already been received or which fall below the sliding window may be discarded, passively ignored and/or optionally logged to a file.

Figure 4:
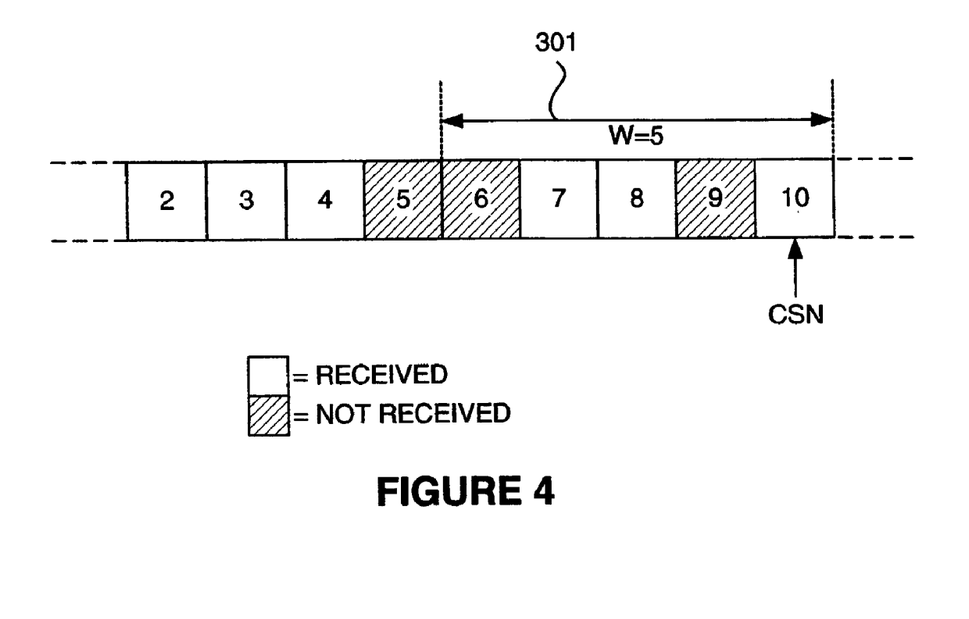
FIG. 4 illustrates the sequence number sliding window of FIG. 3 after a specific number of subsequent messages have been received, according to an illustrative embodiment of the invention.

FIG. 3 illustrates a window of size W=5 and CSN=8. Messages with sequence numbers 4, 7 and 8 have been received, and messages with sequence numbers 5 and 6, if received, as well as any message with a sequence number greater than 8, will be accepted. If a message with sequence number 10 is the next message received, the sliding window 301 will shift to encompass sequence numbers 6-10, as is illustrated in FIG. 4. At any given time, if a message is received with a sequence number that falls within the sliding window and that was not previously received, the message is checked for authentication according to FIG. 2, above. That is, the RGW computes an authentication credential based on the received message's sequence number, a password corresponding to the received user ID, and various other appropriate data fields, and compares the authentication credential value with an authentication credential value obtained from the received message. If the two authentication credential values match, the RGW updates in its memory (e.g., in a database) a success indicator for the received sequence number to indicate that the message authenticated successfully (e.g., message with SN=10 in FIG. 4).

In combination with the above-described modified Digest Authentication, a remote device, e.g., remote device 125, and the RGW 115 may use encryption to protect the contents of transmitted NA control messages. In one illustrative embodiment, session initiation protocol (SIP, see IETF RFC 2543) may be used to establish and maintain communications between a remote device and the RGW. Using symmetric key encryption, a two-tier key management scheme may be used. A primary shared secret between the user and the RGW 115, e.g., the user's password, may be used to generate a secondary key that is subsequently used to encrypt messages sent back and forth between the remote device 125 and the RGW 115 (and/or the NA). After the initial session communications, subsequent communications may be encrypted using the secondary key as agreed by the remote device 125 and the RGW 115 during initial session communications. One of skill in the art will appreciate that a single-tier encryption scheme may alternatively be used.

In one illustrative embodiment of the invention, the secondary key serves as a session key, and a new secondary key is generated for each communication session between the remote device 125 and the RGW 115. In another illustrative embodiment of the invention, the secondary key may be generated on a less frequent basis, e.g., daily. Each day a new day key may be generated that is used to encrypt messages. Thus, because the day key does not expire at the end of each control session, encryption negotiation messages are not required when each new session is initiated. Encryption negotiation messages might only be necessary during the first session after expiration of the secondary key, e.g., once per day. Other expiration limits for the secondary key may alternatively be used, e.g., hourly, half-day, two days, etc. (Even though encryption negotiation is not required at each session, application software in the remote data processing device 125, 127 or 129 may require authentication of the user before allowing the user to control the NA.)

Figure 5:
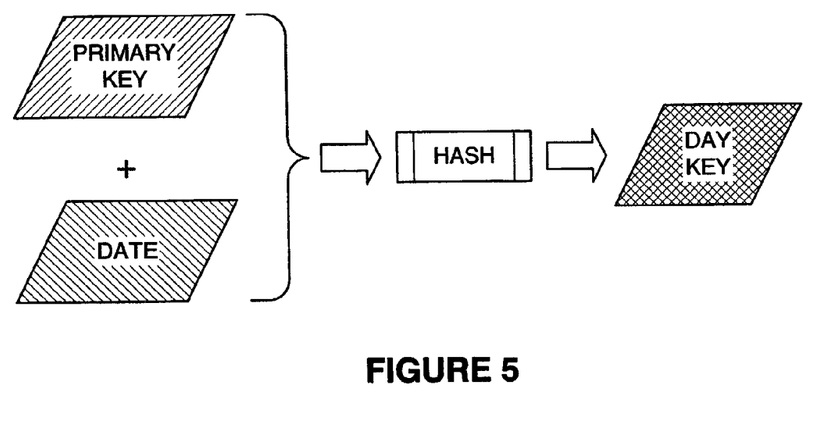
FIG. 5 illustrates a secondary key generation technique according to an illustrative embodiment of the invention.

With reference to FIG. 5, in one illustrative embodiment of the invention the secondary key is generated by hashing a concatenation of the primary key (i.e., the user's password) and the current date. This results in a secondary key that automatically expires and refreshes once per day. However, this scheme does not provide forward secrecy, i.e., an attacker that compromises the master key can compute all previous day keys and decrypt all recorded messages. Thus, in another illustrative embodiment the Secure Remote Password (SRP) protocol may be used to authenticate the user's password and to exchange session or secondary keys over any trusted or untrusted network. SRP resists dictionary attacks (i.e., weak passphrases, such as short common words, can be used safely), provides forward secrecy, and does not store user passwords in cleartext or a cleartext equivalent (i.e., an attacker capturing the password database file will not compromise the passwords). The RGW 115 may maintain a timer for the SRP-generated secondary key, such that the secondary key expires after a predetermined amount of time, e.g., twenty-four hours. Until the timer expires, however, the same secondary key may be used for encryption of all messages between the accessing remote device 125 and the RGW 115. After the timer expires and a user wants to access a networked appliance, SRP is again used to generate a new secondary key.

Because multiple users may access the same RGW 115 to access the networked appliances accessible through the RGW, multiple users may use the same remote device (e.g., a PC shared by multiple users) to access multiple RGWs, and because the same user may access the RGW and the networked appliances using multiple remote devices (e.g., via a mobile telephone while in the car, and via a PC while at work), unique session keys and/or sequence number spaces may be used for each user, remote device, and RGW combination, referred to as a <user, device, RGW> tuple. Generally, a sequence number space refers to an allotment of allowable sequential identifiers that a remote device and/or remote user may use to access the RGW.

Figure 6:
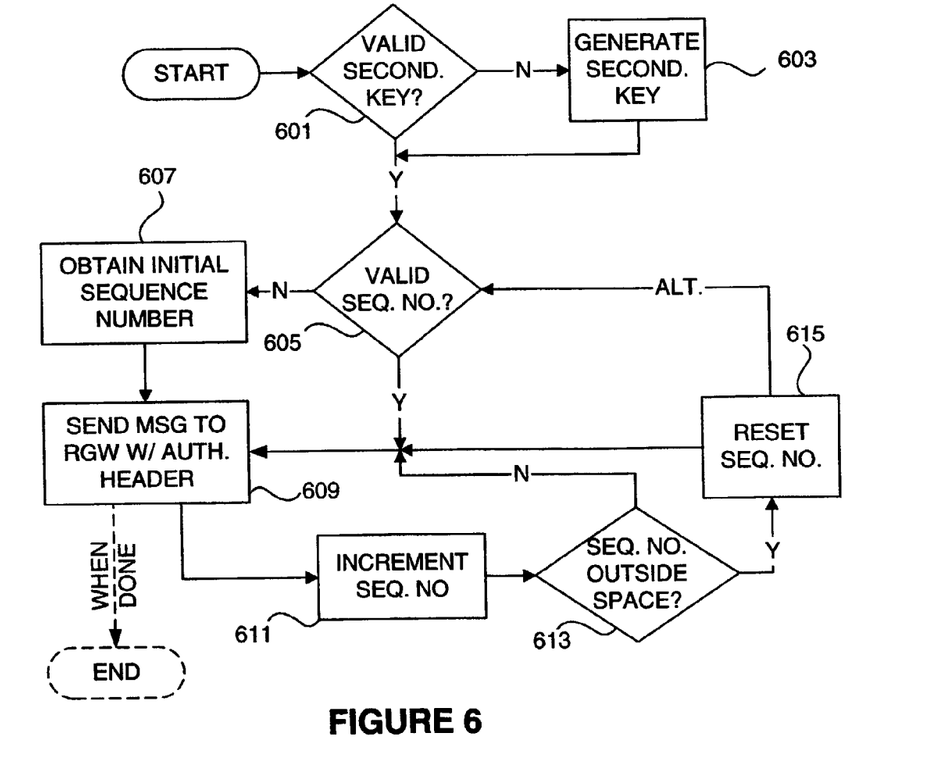
FIG. 6 illustrates a method for a remote device to establish a connection with a residential gateway according to an illustrative embodiment of the invention.

FIG. 6 illustrates a method for a remote device 115 to initiate a control session with the RGW 115. The method is initiated when a user, using the remote device, indicates that the user desires to control a networked appliance. In step 601, the remote device determines whether a valid secondary key exists for the current <user, device, RGW> tuple. The key may be based on a user ID, or on the user ID/password combination. Alternatively, the user's password might not be required by the remote device, but instead is required and authenticated by the RGW and/or the NA. If a valid secondary key does not exist, the remote device generates a secondary key in step 603, creating a secondary key as described with respect to FIG. 5, by using SRP as discussed above, or a known secondary key generation method.

Once the remote device and the RGW have negotiated the secondary key, or if a valid secondary key already exists for the <user, device, RGW> tuple, then the remote device determines in step 605 whether the next sequence number for the <user, device, RGW> tuple is known. For example, if the <user, device, RGW> tuple was previously used to access a NA, the remote device may store the last sequence number used, and continue with the next successive or incremented sequence number. However, if the next sequence number is not known, the remote device in step 607 obtains a sequence number by sending a message to the RGW without an authentication header, which will trigger the RGW to initiate digest authentication as is described above with respect to FIG. 2. After the sequence number has been negotiated, or when the next sequence number for the <user, device, RGW> tuple is known, the remote device, in step 609, sends a NA control message to the RGW for further delivery to the specified NA.

After sending a control message to the RGW, in step 611 the remote device increments the sequence number. In step 613 the remote device determines whether the incremented sequence number is within an allotted sequence number space, as further described below. If the incremented sequence number is outside the allotted sequence number space, then in step 615 the remote device resets the sequence number space by either marking the sequence number space as used so that it is not repeated, indicating that the next sequence number is not known (e.g., force the remote device to return to step 605, as shown in the alternate path in FIG. 6, so that the remote device can obtain a new next sequence number from the RGW), or by resetting the sequence number to a known initial sequence number. If the incremented sequence number is within the allotted sequence number space, or after the remote device resets the sequence number space, the remote device may return to step 609 and send another NA control message. The remote device may continue to cycle through steps 609-615 as necessary to control the NA.

As stated above, a user may access the RGW 115 using multiple remote devices, e.g., a PC 125 while at work, and a phone 127 while away from home and work. Given such a scenario, the RGW 115 and the remote devices 125, 127 may administer and maintain the secondary keys (when used) and sequence numbers using various techniques. In a first illustrative embodiment, a single secondary key and sequence number space is shared between the multiple remote devices 125, 127 for a single user. Each time the user initiates a session with one of the remote devices 125, 127, the remote device synchronizes the sequence number with the RGW 115 to ensure that the proper sequence number is being used, and waits for a timeout delay to ensure that overlapping messages from the other device are not still in transit.

In another illustrative embodiment of the invention, a single secondary key may be maintained per user regardless of the remote device the user is using to access the RGW. That is, there is a single full sequence number space allotted for each <user, RGW> pair. However, the sequence number space allotted for the single secondary key may be split into mini-sequence number spaces (and thus separate sliding windows) for each remote device. The sequence number space may be split evenly between remote devices, or may be split proportionally to how often the user uses each remote device to access the RGW. For example, when a remote device initiates communications with an RGW, the remote device may include an indication of the frequency with which the user expects to access the RGW from that remote device, and the RGW may split the sequence number space or assign a mini-sequence number space based on the indication. In another example, the RGW may automatically deduce access frequency by each remote device by analyzing access times, frequencies, and the like, and split the sequence number space or assign a mini-sequence number space based on this analysis. Other split algorithms may alternatively be used (e.g., random and on-demand splitting when a new remote device is used).

Figure 7:
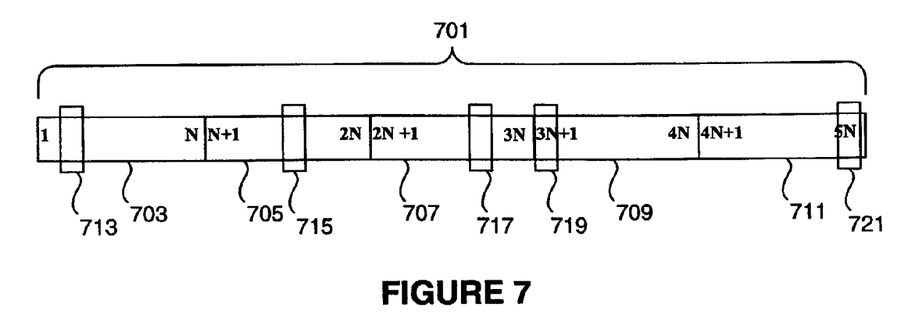
FIG. 7 illustrates a sequence number space divided into mini-sequence number spaces according to an illustrative embodiment of the invention.

FIG. 7 illustrates a sequence number space 701 split evenly into five mutually exclusive mini-sequence number spaces 703, 705, 707, 709, and 711 for five distinct remote devices that a user uses to access an RGW 115. In FIG. 7, the sequence number space includes the sequence numbers 1-5N, and each of the five mini-sequence number spaces is allotted N sequence numbers. Each mini-sequence number space 703, 705, 707, 709, and 711 has an associated sliding window 713, 715, 717, 719, and 721, respectively. The sliding window for each mini-sequence number space may be the same size or varying sizes. In one embodiment, the sequence number field in each message is a 32-bit field, thus $5N=2^{32}$.

Figure 8:
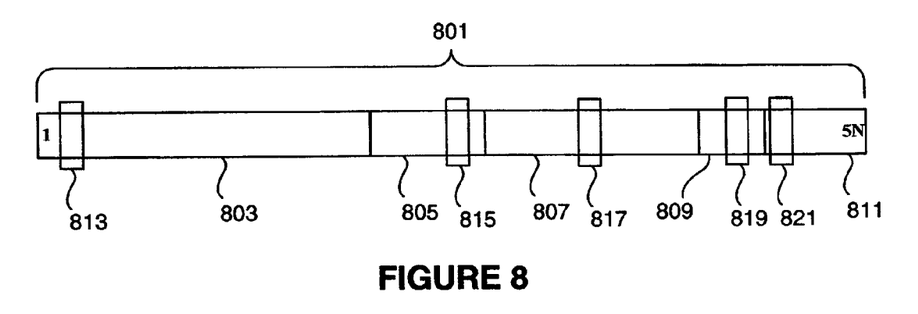
FIG. 8 illustrates a sequence number space divided into mini-sequence number spaces according to an illustrative embodiment of the invention.

FIG. 8 illustrates a sequence number space 801 split proportionally into five mutually exclusive mini-sequence number spaces 803, 805, 807, 809, and 811 for five distinct remote devices. Again, each mini-sequence number space 803, 805, 807, 809, and 811 has an associated sliding window 813, 815, 817, 819, and 821, respectively. Mini-sequence number space 803, being the largest, may correspond to a remote device that the user uses frequently to access the RGW 115, e.g., a personal computer located at the user's business office. Likewise, mini-sequence number space 809, the smallest, may correspond to a device used only infrequently to access the RGW, e.g., a cellular phone.

Regardless of whether the sequence number space is split evenly or proportionally, the sequence number space may be modified by splitting or combining mini-sequence number spaces in order to accommodate the addition or removal of remote devices registered with the RGW 115. For example, state information for a remote device may be removed from the RGW if a user has not used the remote device to access the RGW within a predetermined amount of time, e.g., one day, two weeks, one month, etc. When a remote device uses its entire allotted mini-sequence number space, the remote device may reset its sequence number space or may use another mini-sequence number space not currently used by another remote device, as described herein.

Figure 9:
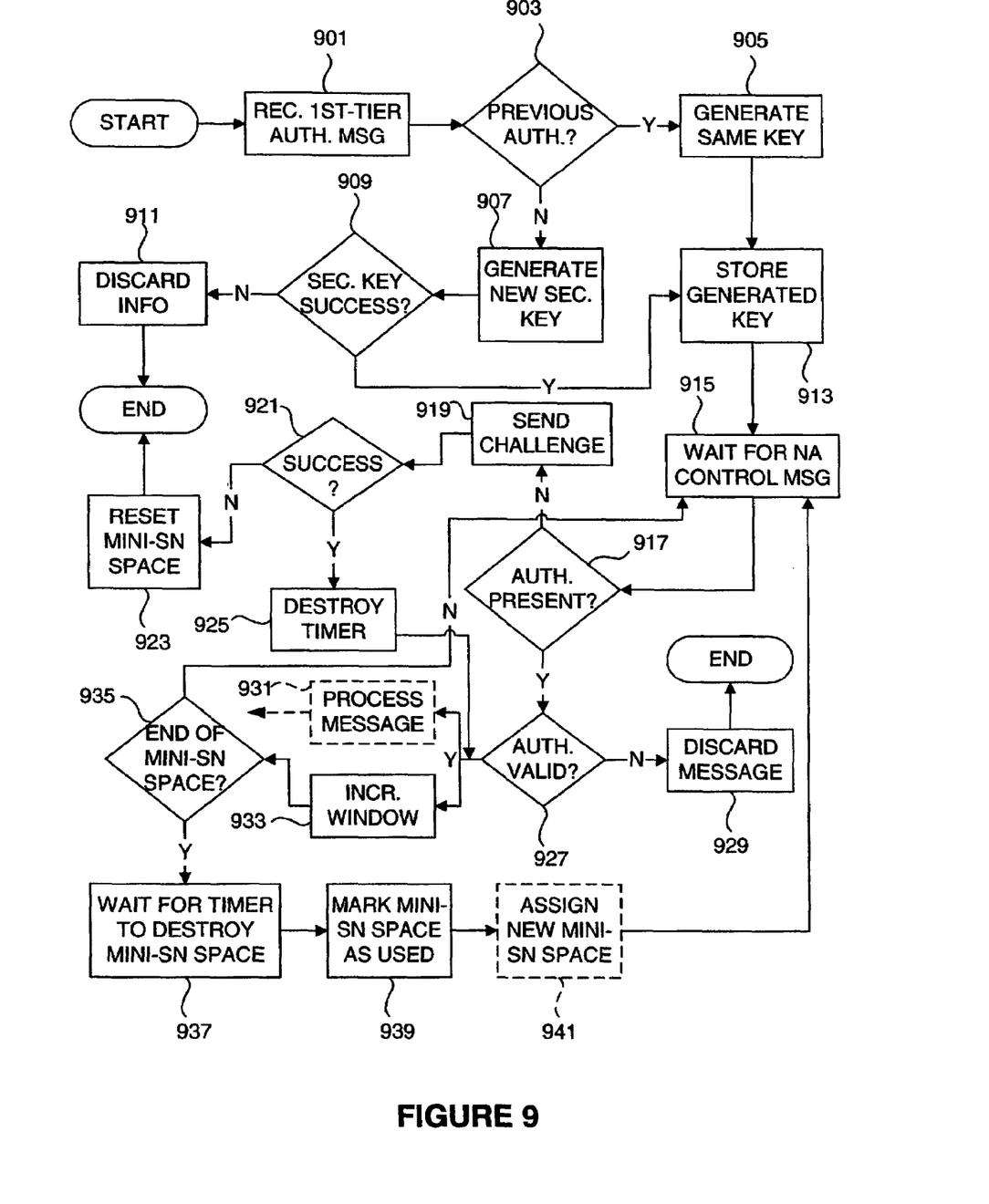
FIG. 9 illustrates a method for authenticating and communicating with a remote device by a residential gateway using a single secondary key for a user across multiple remote devices, according to an illustrative embodiment of the invention.

FIG. 9 illustrates a method for authenticating and communicating with a remote device by the RGW using a single secondary key for a user across multiple remote devices, as described above. In step 901, RGW 115 receives a message initiating a first-tier authentication mechanism, e.g., SRP, from a remote device 125 indicating that a user desires to control a resource, e.g., NA 103. In response, in step 903 the RGW determines whether a still-valid secondary key already exists for the specified user as a result of the user accessing the RGW using a different remote device. When a still-valid secondary key exists, the RGW generates the same key in step 905, and sends it to the remote device. For example, when SRP is used, the RGW may encrypt the still-valid key using a new key generated as a result of the present SRP session, and send the encrypted key to the remote device. When the remote device receives the encrypted key, it can decrypt the still-valid key using the new key, store the still-valid key for future use, and discard the new key. In step 913 the RGW stores the key for future reference.

If a still-valid secondary key does not still exist, the RGW generates a new secondary key (step 907) according to the protocol in use (e.g., primary key/date hash, SRP, etc.). In step 909, the RGW determines whether the secondary key generation was a success and, if so, in step 913 stores the newly generated secondary key for future reference. If the secondary key generation was not a success, e.g., because the remote user does not have the correct password or due to communication errors, the RGW in step 911 discards the state information associated with the key generation and terminates the process.

Once the proper secondary key has been stored, the RGW waits for a networked appliance control message in step 915. Once received, the RGW determines whether the received message has an authentication header (step 917). If the received message does not have an authentication header, the RGW responds to the remote device in step 919 by sending a 401 Unauthorized message with a WWW-Authenticate header initiating a Digest Authentication with an initial mini-sequence number from an available range of mini-sequence numbers as the nonce value, starting a reply-by timer, and waiting for a new control message from the remote device. When the new control message is received, the RGW determines in step 921 whether the authentication header contained in the new control message results in a success according to Digest Authentication as described above. If authentication was not successful, the RGW in step 923 resets the mini-sequence number space that would have been assigned to the remote device, indicating the mini-sequence number space is available for use by another remote device if necessary. If authentication is successful in step 921, the RGW in step 925 clears the timer. Then the control message will be processed in step 931 as usual, and the sliding window will be adjusted accordingly in step 933.

If, in step 917, a received NA control message has an authentication header, the RGW determines in step 927 whether the message successfully authenticates by recomputing the authentication credential based on the message's sequence number, the user's stored password, and other appropriate information, e.g., according to the Digest Authentication specification. The RGW then compares the authentication credential to the authentication credential received in the message. If the two credential values match, the message is successfully authenticated. If not successfully authenticated, the RGW discards the message in step 929 (and/or logs the message, reports the message to an administrator, etc.). If the RGW successfully authenticates the message, the RGW simultaneously continues processing the message in step 931, and in step 933 increments the sliding window associated with the mini-sequence number space in use by the remote device.

After incrementing the sliding window, in step 935 the RGW determines whether the sliding window has reached the end of the allotted mini-sequence number space. If the sliding window has reached the end of the mini-sequence number space, then the RGW may initiate a timer, upon the expiration of which the RGW in step 937 may delete the state information associated with the mini-sequence number space, and in step 939 the RGW indicates in its memory that the mini-sequence number space has been used. Optionally, in step 941, the RGW may assign a new mini-sequence number space to the remote device by indicating the start of the new mini-sequence number space as the nonce value in the next message sent back to the remote device. After assigning the new mini-sequence number space, the RGW returns to step 915 and waits for another NA control message. Alternatively to step 941 (not shown), the RGW may wait for the remote device to send a message beyond the previously allotted mini-sequence number space, and send a challenge back to the remote device, including a WWW-Authenticate header with a new sequence number in the newly allotted mini-sequence number space as nonce.

If in step 935 the RGW determines that the sliding window has not reached the end of the assigned mini-sequence number space, the method returns to step 915 where the RGW waits for another NA control Message.

Figure 10:
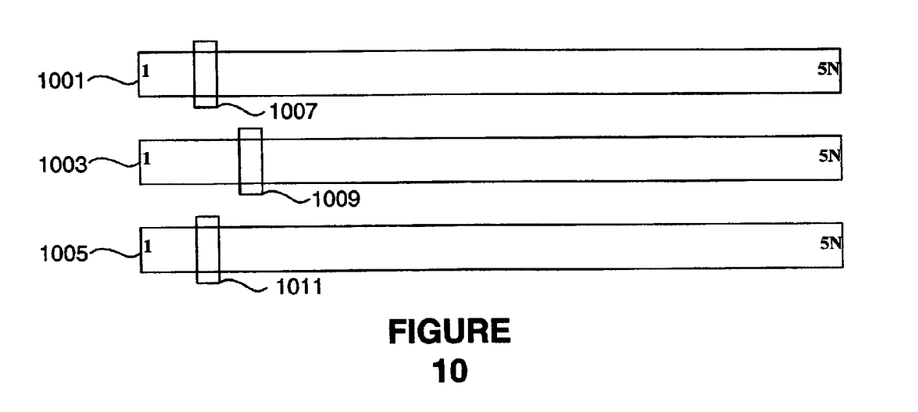
FIG. 10 illustrates unique sequence number spaces for a user across multiple remote devices, according to an illustrative embodiment of the invention.

With reference to FIG. 10, in another illustrative embodiment of the invention, instead of using a common secondary key per user regardless of remote device, separate secondary keys may be used at each remote device through which a user accesses the RGW. In this embodiment, the RGW 115 may maintain different sequence number spaces 1001, 1003, and 1005, with sliding windows 1007, 1009, and 1011, respectively, for each remote device a user uses to access the RGW. That is, there is a full unique sequence number space allotted for each <user, device, RGW> tuple.

Figure 11:
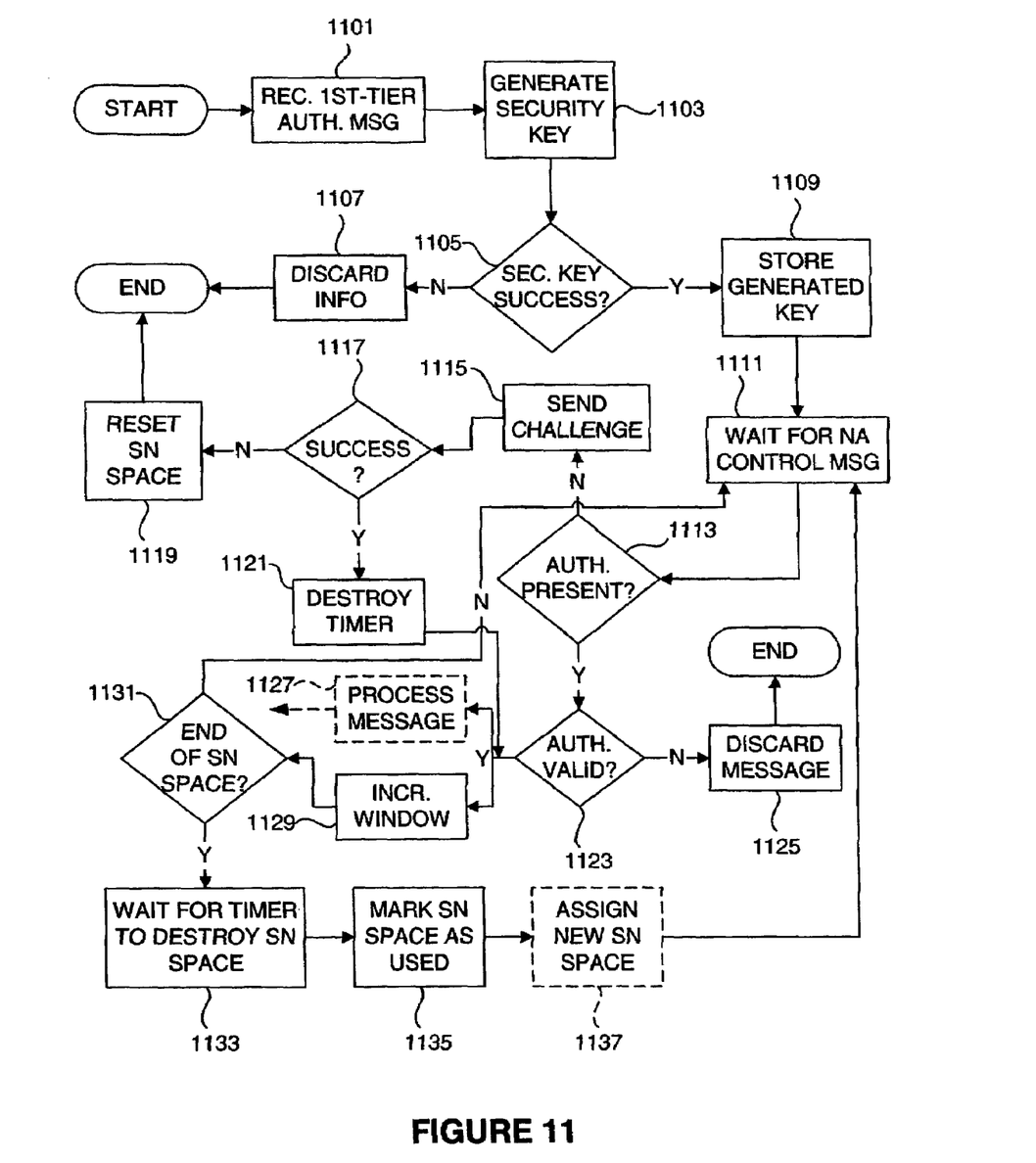
FIG. 11 illustrates a method for authenticating and communicating with a remote device by a residential gateway using unique secondary keys for a user across multiple remote devices, according to an illustrative embodiment of the invention.

FIG. 11 illustrates a method for authenticating and communicating with a remote device by the RGW using unique secondary keys for a user at each unique <user, device, RGW> tuple. In step 1101, RGW 115 receives a message initiating a first-tier authentication mechanism, e.g., SRP, from a remote device 125 indicating that a user desires to control a resource, e.g., NA 103. In response, in step 1103 the RGW generates a new secondary key according to the protocol in use (e.g., primary key/date hash, SRP, etc.). In step 1105, the RGW determines whether the secondary key generation was a success and, if so, the RGW in step 1109 stores the newly generated secondary key for future reference. If the secondary key generation was not a success, the RGW in step 1107 discards the state information associated with the key generation and terminates the process.

Once the new secondary key has been stored, the RGW waits for a networked appliance control message in step 1111. Once received, the RGW determines whether the received message has an authentication header (step 1113). If the received message does not include an authentication header, the RGW responds to the remote device in step 1115 by sending a message with a WWW-Authenticate header initiating Digest Authentication mechanism with an initial sequence number of an available range of sequence numbers as the nonce value, starting a reply-by timer, and waiting for a new control message from the remote device. When the new message is received, the RGW determines in step 1117 whether the authentication is a success, e.g., according to digest authentication as described above. If authentication was not successful, the RGW in step 1119 resets the sequence number space that would have been assigned to the remote device, indicating the sequence number space is available for use by another <user, device, RGW> tuple if necessary. If authentication is successful in step 1117, the RGW in step 1121 clears the timer. Then, the RGW processes the control message in step 1127 as usual, and adjusts the sliding window accordingly in step 1129.

If, in step 1113, a received NA control message has an authentication header, the RGW determines in step 1123 whether the message authentication is valid by recomputing the authentication credential based on the message's sequence number, the user's stored password, and other appropriate information. The RGW 115 then compares the authentication credential to the authentication credential received in the message. If the two credential values match, the message is successfully authenticated. If not successfully authenticated, the RGW discards the message in step 1125 (and/or logs the message, reports the message to an administrator, etc.). If the RGW successfully authenticates the message, the RGW simultaneously continues processing the message in step 1127, and in step 1129 increments the sliding window associated with the sequence number space in use by the remote device.

After incrementing the sliding window, in step 1131 the RGW determines whether the sliding window has reached the end of the allotted sequence number space. If the sliding window has reached the end of the sequence number space, then the RGW may initiate a timer, upon the expiration of which the RGW in step 1133 may delete the state information associated with the sequence number space, and in step 1135 the RGW indicates in its memory that the sequence number space has been used. Optionally, in step 1137, the RGW may assign a new sequence number space to the remote device by indicating the start of the new sequence number space as the nonce value in the next message sent back to the remote device. After assigning the new sequence number space, the RGW returns to step 1111 and waits for another NA control message. Alternatively to step 1137 (not shown), the RGW may wait for the remote device to send a message beyond the previously allotted sequence number space, and send a challenge back to the remote device, including a WWW-Authenticate header indicating a new sequence number in the newly allotted sequence number space as nonce.

If in step 1131 the RGW determines that the sliding window has not reached the end of the assigned mini-sequence number space, the method returns to step 1111 where the RGW waits for another NA control Message.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 12:
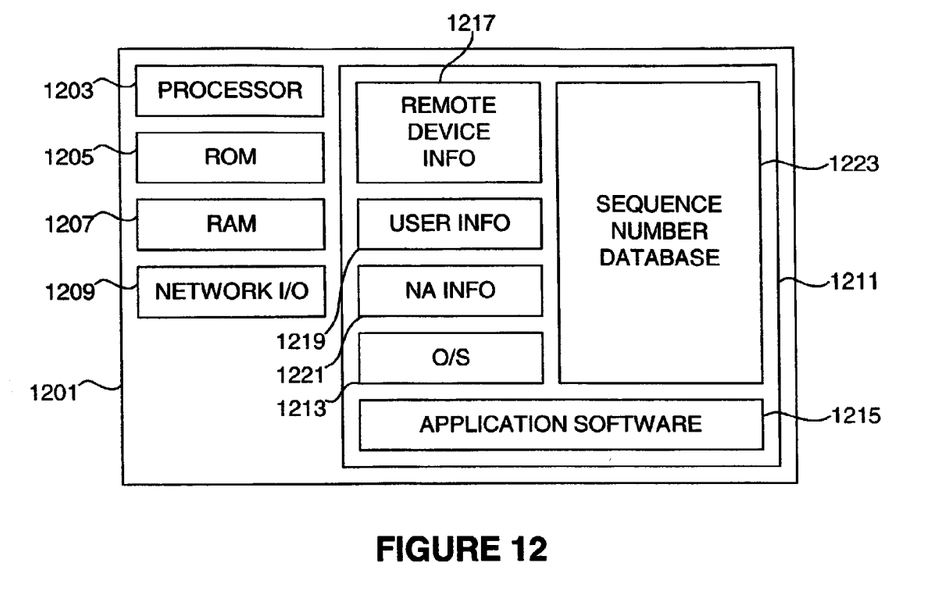
FIG. 12 illustrates a block diagram of a residential gateway according to an illustrative embodiment of the invention.

For example, FIG. 12 illustrates a block diagram of a residential gateway (RGW) 1201 that may be used with one or more illustrative embodiments of the invention. RGW 1201 may include a processor 1203, ROM 1205, RAM 1207, network interface 1209, and memory 1211. The memory 1211 may store computer executable instructions embodying operating system software 1213 and application software 1215. Application software 1215 operates as described above, relying on remote device information 1217, user information 1219, networked appliance information 1221, and sequence number information 1223.

Figure 13:
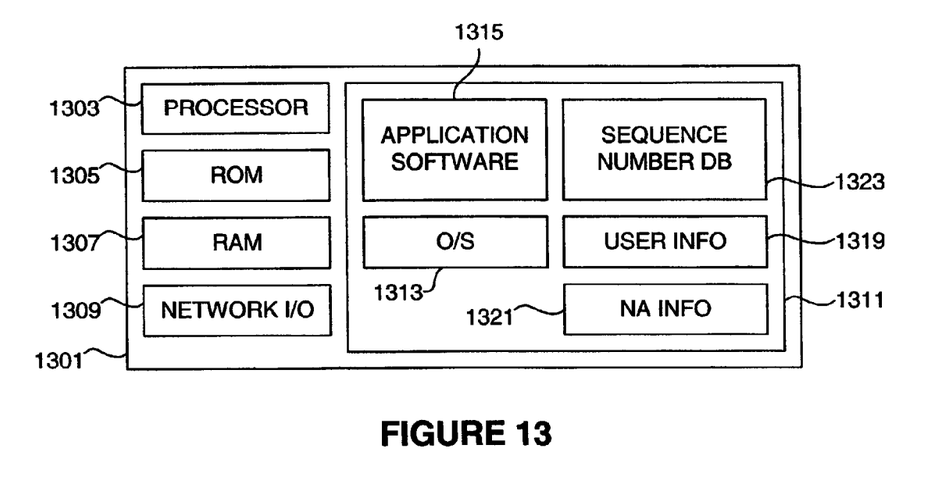
FIG. 13 illustrates a block diagram of a remote device according to an illustrative embodiment of the invention.

Similarly, FIG. 13 illustrates a block diagram of a remote device that may be used with one or more embodiments of the invention. Remote device 1301 may include a processor 1303, ROM 1305, RAM 1307, network interface 1309, and memory 1311. Memory 1311 may store computer executable instructions embodying an operating system 1313 and application software 1315 that performs as described above, relying on user information 1319, networked appliance information 1321, and sequence number database 1323.

While the invention has been described with respect to specific examples including presently preferred modes of carrying out the invention, those skilled in the art will appreciate that there are numerous variations and permutations of the above described systems and techniques. For example, full sequence number spaces may be used for each device a user uses to access the RGW, regardless of whether the RGW requires a unique secondary key for each user at each distinct remote device used by that user. Thus, the spirit and scope of the invention should be construed broadly as set forth in the appended claims.

We claim:

1. A device, comprising:
   a database configured to store information corresponding to ranges of sequence numbers associated with pairs of users and remote devices, and to store sliding window information corresponding to each range of sequence numbers; and
   a processor configured to control operation of the device, and further configured to:
   (i) receive a first message comprising a user identification (ID) and a first remote device ID,
   (ii) assign a first available range of sequence numbers to the user ID and first remote device ID pair,
   (iii) receive a second message comprising the user ID and a second remote device ID, and
   (iv) assign a second available range of sequence numbers to the user ID and second remote device ID pair,
   wherein the first available range of sequence numbers and the second available range of sequence numbers each comprise a sub-part of a range of sequence numbers assigned to the user ID, and wherein the size of each of the first available range of sequence numbers and the second available range of sequence numbers is proportional to an access frequency used by the user ID.

2. The device of claim 1, wherein the first and second received messages each comprises encrypted data, and wherein the processor is further configured to, for each of the first and second received messages, decrypt the encrypted data using a decryption key corresponding to the user ID.

3. The device of claim 2, wherein the encrypted data comprises networked appliance information.

4. The device of claim 1, wherein each received message comprises encrypted data, and wherein the processor is further configured to:
   (v) decrypt the encrypted data in the first received message using a first decryption key corresponding to the user ID and first remote device ID pair; and
   (vi) decrypt the encrypted data in the second received message using a second decryption key, different from the first decryption key, corresponding to the user ID and second remote device ID pair.

5. The device of claim 1, wherein the first available range of sequence numbers and the second available range of sequence numbers are mutually exclusive.

6. The device of claim 1, wherein the first available range of sequence numbers and the second available range of sequence numbers are of equal size.

7. A device, comprising:
   a database configured to store information corresponding to ranges of sequence numbers associated with pairs of users and remote devices, and to store sliding window information corresponding to each range of sequence numbers; and a processor configured to control operation of the device, and further configured to:
  (i) receive a first message comprising a user identification (ID) and a first remote device ID,
  (ii) assign a first available range of sequence numbers to the user ID and first remote device ID pair,
  (iii) receive a second message comprising the user ID and a second remote device ID, and
  (iv) assign a second available range of sequence numbers to the user ID and second remote device ID pair,
wherein the first available range of sequence numbers and the second available range of sequence numbers each comprise a sub-part of a range of sequence numbers assigned to the user ID, where the size of each of the first available range of sequence numbers is proportional to an access frequency used by a first remote device having the first remote device ID, and the second available range of sequence numbers is proportional to an access frequency used by a second remote device having the second remote device ID.

8. The device of claim 1, where the size of each of the first available range of sequence numbers is proportional to the access frequency used by the user ID using a first remote device having the first remote device ID, and the second available range of sequence numbers is proportional to an access frequency used by the user ID using a second remote device having the second remote device ID.

9. A device, comprising:
a sequence number database configured to store information corresponding to ranges of sequence numbers associated with pairs of users and remote devices, and to store sliding window information corresponding to each range of sequence numbers, said sliding window information indicating whether each message within the sliding window has or has not been received;
a processor configured to control operation of the device, and further configured to:
  (i) receive a message comprising a first authentication credential, a user identification (ID) and a predetermined sequence number;
  (ii) retrieve a secret corresponding at least to the user ID;
  (iii) generate a second authentication credential based on information comprising the retrieved secret and the predetermined sequence number;
  (iv) compare the first and second authentication credentials,
  (v) query the database for the received sequence number; and
  (vi) accept the message when the first and second authentication credentials match and
    (1) the sequence number is within the corresponding window of sequence numbers and is marked as not received, or
    (2) the sequence number is above the corresponding window of sequence numbers;
  (vii) move the corresponding window of sequence numbers up to the sequence number when in step (vi) the sequence number is above the window of allowed sequence numbers; and
  (viii) mark the received sequence number as received within the window.

10. The device of claim 9, wherein in step (i) the received message comprises encrypted data, and the processor is further configured to select a decryption key based on the user ID and a device ID corresponding to a device used to send the message.

11. The device of claim 9, wherein in step (i) the message comprises a networked appliance message.

12. The device of claim 9, wherein in step (i) the authentication credential is stored in a response field.

13. The device of claim 9, wherein in step (ii) the secret corresponds to a combination of the user ID and a device ID corresponding to a device used to send the message.

14. A devices, comprising:
a user database configured to store user authentication information;
a sequence number database configured to store information corresponding to ranges of sequence numbers associated with pairs of users and remote devices, and configured to store sliding window information corresponding to each range of sequence numbers, said sliding window information indicating whether messages having sequence numbers within the sliding window have or have not been received; and
a processor configured to control operation of the device, and further configured to:
  (i) receive a networked appliance control message comprising a first authentication credential value, a user identification (ID) and a sequence number;
  (ii) query the sequence number database for the sequence number;
  (iii) reject the networked appliance control message when the sequence number is below the corresponding window of sequence numbers, or the sequence number is within the corresponding window of sequence numbers and is marked as received;
  (iv) query the user database for a password corresponding to the user ID;
  (v) generate a second authentication credential based on information including the password and the sequence number;
  (vi) compare the first and second authentication credentials;
  (vii) reject the networked appliance control message when the two authentication credentials do not match;
  (viii) accept networked appliance control message when the authentication credentials match and, either, the sequence number is within the corresponding window of sequence numbers and is marked as not received, or the sequence number is above the corresponding window of sequence numbers;
  (ix) move the corresponding window of sequence numbers up to the sequence number when in step (viii) the sequence number is above the window of allowed sequence numbers and the authentication credentials match; and
  (x) mark the sequence number as received within the window.

15. The device of claim 14, wherein the networked appliance message comprises encrypted data, and the processor is further configured to decrypt the message using a decryption key based on the user ID and a device ID corresponding to the remote access device used to send the message.

16. A device, comprising:
a storage apparatus configured to store user authentication information, to store information corresponding to ranges of sequence numbers associated with pairs of users and remote devices, and to store sliding window information corresponding to each range of sequence numbers, the sliding window information indicating whether messages having sequence numbers within a window have or have not been received; and a processor configured to control operation of the device, and further configured to:
receive a plurality of networked appliance control messages each comprising a first authentication credential value, a user identification (ID) and a sequence number,
for at least one of the messages, reject the message in response to the sequence number being below the window of sequence numbers or within the window of sequence numbers and indicated by the sliding window information as being associated with a message that has been received,
for each message, determine a password associated with the user ID,
for each message, generate a second authentication credential based on information including the password and the sequence number,
for at least one of the messages, compare the first and second authentication credentials;
for at least one of the messages, reject the message when the two authentication credentials do not match;
for at least one of the messages, accept the message in response to the authentication credentials matching and, either: the sequence number being within the corresponding window of sequence numbers and marked as not received or the sequence number being above the window of sequence numbers,
for at least one of the messages, move the window of sequence numbers to a position depending upon the sequence number in response to the sequence number being above the window of sequence numbers and the authentication credentials matching, and
for at least one of the message, update the sliding window information to indicate that a message having the sequence number has been received.

17. A computer-readable medium storing computer-executable instructions that instruct a computer to perform steps, the steps comprising:
receiving a plurality of networked appliance control messages each comprising a first authentication credential value, a user identification (ID) and a sequence number;
for at least one of the messages, rejecting the message in response to the sequence number being below a predetermined window of sequence numbers or within the window of sequence numbers and indicated by stored sliding window information as being associated with a message that has been received;
for each message, determining a password associated with the user ID;
for each message, generating a second authentication credential based on information including the password and the sequence number;
for at least one of the messages, comparing the first and second authentication credentials;
for at least one of the messages, rejecting the message when the two authentication credentials do not match;
for at least one of the messages, accepting the message in response to the authentication credentials matching and, either: the sequence number being within the corresponding window of sequence numbers and marked as not received or the sequence number being above the window of sequence numbers;
for at least one of the messages, moving the window of sequence numbers to a position depending upon the sequence number in response to the sequence number being above the window of sequence numbers and the authentication credentials matching; and
for at least one of the message, updating the sliding window information to indicate that a message having the sequence number has been received.

* * * * *